(12) United States Patent
Narendra et al.

(10) Patent No.: US 9,113,329 B2
(45) Date of Patent: Aug. 18, 2015

(54) MOBILE DEVICE LEARNING MODE FOR SECURE IDENTIFICATION

(71) Applicant: Tyfone, Inc., Portland, OR (US)

(72) Inventors: Siva G. Narendra, Portland, OR (US); Pradeep H. Rajashekarappa, Bangalore (IN); Saurav Chakraborty, West Bengal (IN); Donald Allen Bloodworth, Camas, WA (US); Prabhakar Tadepalli, Bangalore (IN); Kishan H Saralaya, Kasargod (IN)

(73) Assignee: Tyfone, INC., Portland, OR (US)

( * ) Notice: Subject to any disclaimer, the term of this patent is extended or adjusted under 35 U.S.C. 154(b) by 0 days.

(21) Appl. No.: 14/083,208

(22) Filed: Nov. 18, 2013

(65) Prior Publication Data

US 2015/0140966 A1    May 21, 2015

(51) Int. Cl.
*H04M 1/66* (2006.01)
*H04W 12/04* (2009.01)
*H04B 5/00* (2006.01)

(52) U.S. Cl.
CPC ............. *H04W 12/04* (2013.01); *H04B 5/0031* (2013.01)

(58) Field of Classification Search
CPC ..... H04W 12/04; H04W 12/06; H04W 12/08; H04B 5/0031
USPC .................. 455/411, 410, 550.1, 552.1, 556.2
See application file for complete search history.

(56) References Cited

U.S. PATENT DOCUMENTS

| | | | |
|---|---|---|---|
| 2003/0004881 A1* | 1/2003 | Shinzaki et al. | 705/51 |
| 2007/0037614 A1* | 2/2007 | Rosenberg | 455/575.1 |
| 2009/0321510 A1* | 12/2009 | Day et al. | 235/375 |
| 2011/0302297 A1* | 12/2011 | Kruglick | 709/224 |
| 2012/0280783 A1* | 11/2012 | Gerhardt et al. | 340/5.6 |
| 2014/0055262 A1* | 2/2014 | Cavalcanti | 340/539.13 |

* cited by examiner

*Primary Examiner* — Khai M Nguyen
(74) *Attorney, Agent, or Firm* — Dana B. LeMoine

(57) ABSTRACT

A method for prompting the user to scan a radio token in proximity with a mobile device and detecting, via a radio token compatible mechanism within the mobile device, when the radio token passes within a communications distance from the radio token compatible device. So as to provide future indication of the approximate location of the radio token in relation to the mobile device.

26 Claims, 11 Drawing Sheets

MOBILE DEVICE LEARNING MODE FOR SECURE IDENTIFICATION

FIELD

The present invention relates generally to mobile devices, and more specifically to secured identification in mobile devices.

BACKGROUND

Mobile devices have evolved greatly in the past few decades. For example, today a typical mobile device is capable of performing an array of different functionalities. However, there remains a problem with security in mobile devices. Despite significant advances in mobile technology, maintaining an appropriate level of security has not been easy. Typically, mobile devices rely on passwords for security. However, passwords have become increasingly easier to overcome.

DESCRIPTION OF EMBODIMENTS

Figure 1:
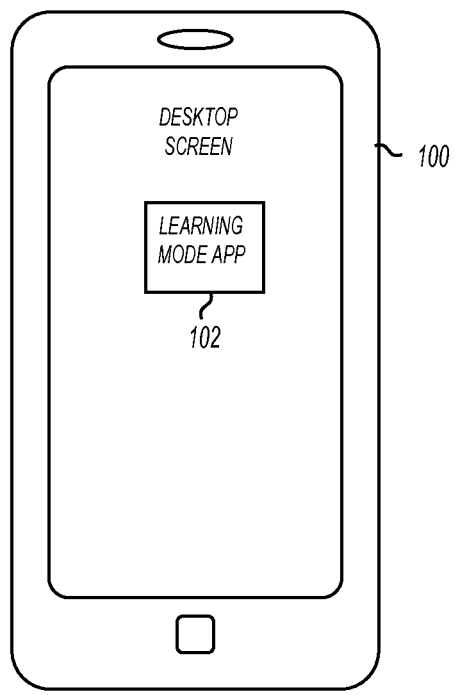
FIG. 1 shows a mobile device with a Learning Mode application icon in accordance with various embodiments of the present invention.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a mobile device with a learning mode application in accordance with various embodiments of the present invention. In some embodiments, a user can launch Learning Mode application 102; while in other embodiments, Learning Mode application 102 can be launched by another application. Mobile device 100 may be any mobile device that includes a communications device capable of communicating with other devices. For example, in some embodiments, mobile device 100 is a mobile phone. In other embodiments, mobile device 100 is a tablet and/or a laptop computer, and in still other embodiments, mobile device 100 is a personal digital assistant.

An example of the communications device within mobile device 100 includes, but is not limited to, an NFC radio capable of communicating with other radio devices. NFC radio may be any radio capable of emitting RF signals compatible with other NFC devices. For example, in some embodiments, NFC radio includes an ISO/IEC 14443 contactless interface capable of emitting an RF signal.

The NFC radio may be used for a variety of purposes. For example, in some embodiments, the NFC radio may be used to communicate with a point of sale device, a radio communications device, or the like. The NFC radio may be located anywhere within mobile device 100. For example, in some embodiments, the NFC radio may be located in the back of mobile the device 100, an edge, a corner, a side, or anywhere else within the mobile device. In some embodiments, it is beneficial to know the approximate location of the NFC radio within mobile device 100.

Learning Mode application 102 is capable of determining the approximate location of the NFC radio within mobile device 100. Learning Mode application 102 prompts a user to interact with the mobile device and a radio token. In response to the user interaction of the radio token with the mobile device, Learning Mode application 102 is capable of detecting the approximate location at which a communications distance is established between a radio token compatible mechanism within mobile device 100 and the radio token. A radio token compatible mechanism may be any device compatible with a radio token and may include an NFC radio, although this is not a limitation of the present invention. As used herein, the term "communications distance" refers to the distance at which any type of communication via radio frequencies is achieved between two electrical components. Further, in some embodiments, Learning Mode application 102 prompts the user to provide additional interaction (e.g., indicating the approximate location of the radio token at the moment of established communication, confirming the approximate location indicated, etc.). As a result, Learning Mode application 102 is capable of identifying the location of the NFC radio within mobile device 100 and provides future indicia to the user of the location of the NFC radio within mobile device 100.

NFC radio in mobile device 100 can be any type of communications device compatible with a radio token. In some embodiments, the radio token may also comprise an NFC radio; however this is not to be taken in a limiting sense of the present invention. The remainder of the description refers to an NFC radio for clarity; however, it is not meant to limit the various embodiments of the invention.

Figure 2:
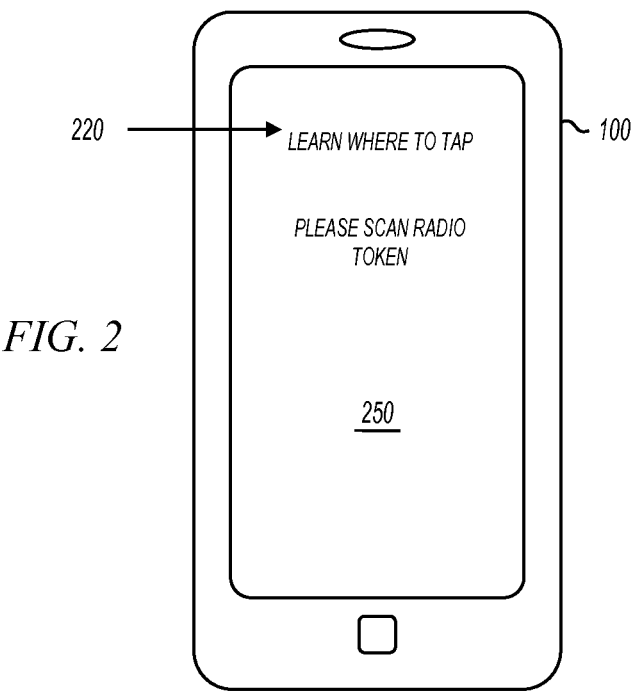
FIG. 2 shows a mobile device displaying a screen within the Learning Mode application prompting a user to scan a radio token in accordance with various embodiments of the present invention.

FIG. 2 shows a mobile device displaying a screen within the Learning Mode application prompting a user to scan a radio token in accordance with various embodiments of the invention. Mobile device 100 includes a touch sensitive display device 250 that is shown displaying Learning Mode application screen 220. Touch sensitive display device 250, in combination with processing circuits coupled thereto, interacts with a user by displaying information and receiving user input.

In operation, Learning Mode application 102 may prompt a user to scan a radio token over the mobile device by displaying a visual message on touch sensitive display device 250; however this is not a limitation of the present invention. In some embodiments, Learning Mode application 102 may prompt the user to scan a radio token with mobile device 100 using other indicia (e.g., audio representation, haptic feedback, etc.)

Figure 3:
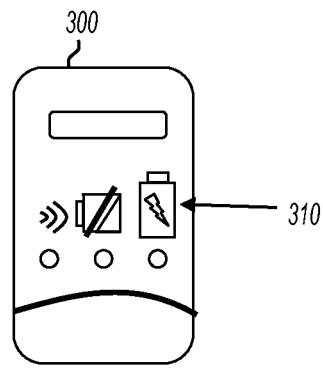
FIG. 3 shows a radio token in accordance with various embodiments of the present invention.

FIG. 3 shows a radio token in accordance with various embodiments of the present invention. Radio token 300 may be any device capable of communicating with a mobile device. Examples include, but are not limited to, a key fob, key chain, and the like. In some embodiments, radio token 300 may include a near field communications (NFC) radio and a secure element. For example, the NFC radio and the secure element may be packaged together in a smartcard controller or may be separate components within radio token 300. Further, in some embodiments, radio token 300 may include a battery, may be rechargeable, or both. The battery may be removable or permanently installed, however this is not to be taken in a limiting sense of the present invention.

Radio token 300 may include indicators 310 that display the status of the radio token. For example, radio token 300 may include a visual battery power indicator. Also, for example, radio token 300 may include a signal strength indicator, a charging capacity indicator and/or other status indicators of the radio token; however this is not a limitation of the present invention. For example, in some embodiments, radio token 300 may include audible or haptic indicators. In other embodiments, indicators 310 may be completely omitted from radio token 300.

Figure 4:
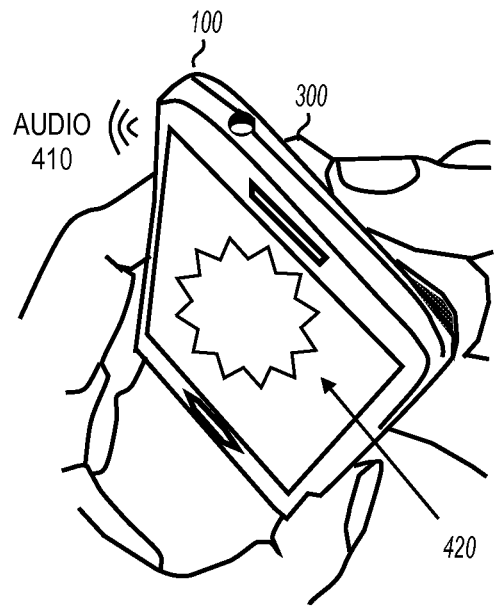
FIG. 4 shows a user scanning a radio token over a mobile device in accordance with various embodiments of the present invention.

FIG. 4 shows a user scanning a radio token over a mobile device in accordance with various embodiments of the present invention. In some embodiments, the user may scan radio token 300 in response to prompting by Learning Mode application 102. For example, the user may scan radio token 300 over mobile device 100 in response to prompting as shown in FIG. 2.

A user may freely scan radio token 300 over at least one surface of mobile device 100. The term "scan" is not to be taken in a limiting sense. Further, as used herein, the term "surface" may refer to any surface, edge, combination and/or plurality thereof. For example a user scanning radio token 300 over at least one surface of mobile device 100 may include a user waving, gesturing and/or surveying radio token 300 in proximity with mobile device 100.

FIG. 4 also shows mobile device 100 alerting the user when a radio token compatible mechanism, within the mobile device, detects radio token 300. As used herein, the term "detect" refers to the mobile device establishing communication between the radio token compatible mechanism and the radio token. In some embodiments, detection occurs when radio token 300 passes within a communications distance from the radio token compatible mechanism within mobile device 100. The approximate location of the radio token compatible mechanism may be determined when radio token 300 is detected.

Mobile device 100 may also provide audio alert 410 when the radio token compatible mechanism, within mobile device 100, detects radio token 300. Although audio alert 410 is shown in FIG. 4, this is not a limitation of the present invention. Mobile device 100 may also alert a user of the detection of the radio token 300 using visual representation such as visual indicator 420 on the mobile device, using haptic representation, or any combination thereof.

Figure 5:
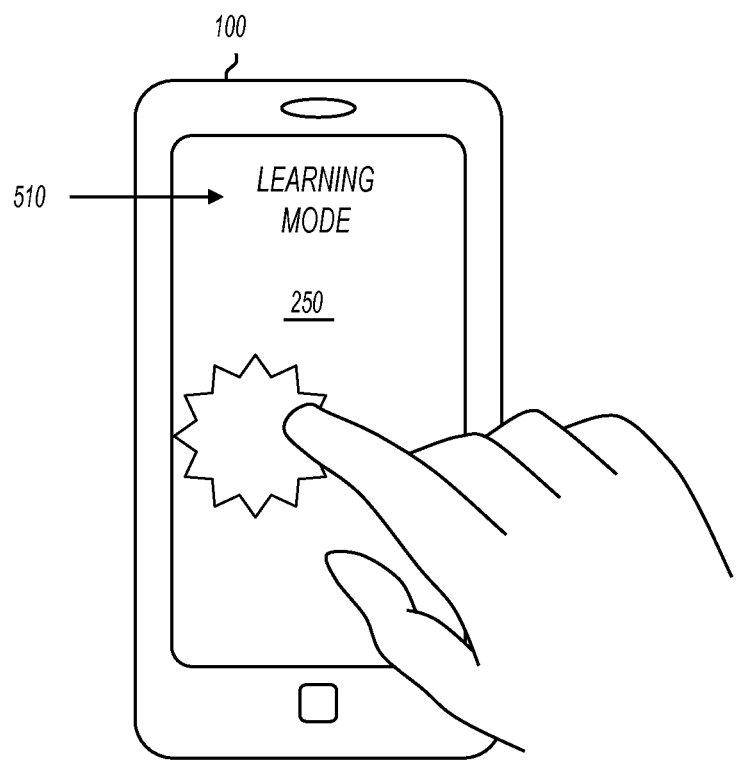
FIGS. 5 and 6 show user interaction with a mobile device during Learning Mode in accordance with various embodiments of the present invention.
Figure 6:
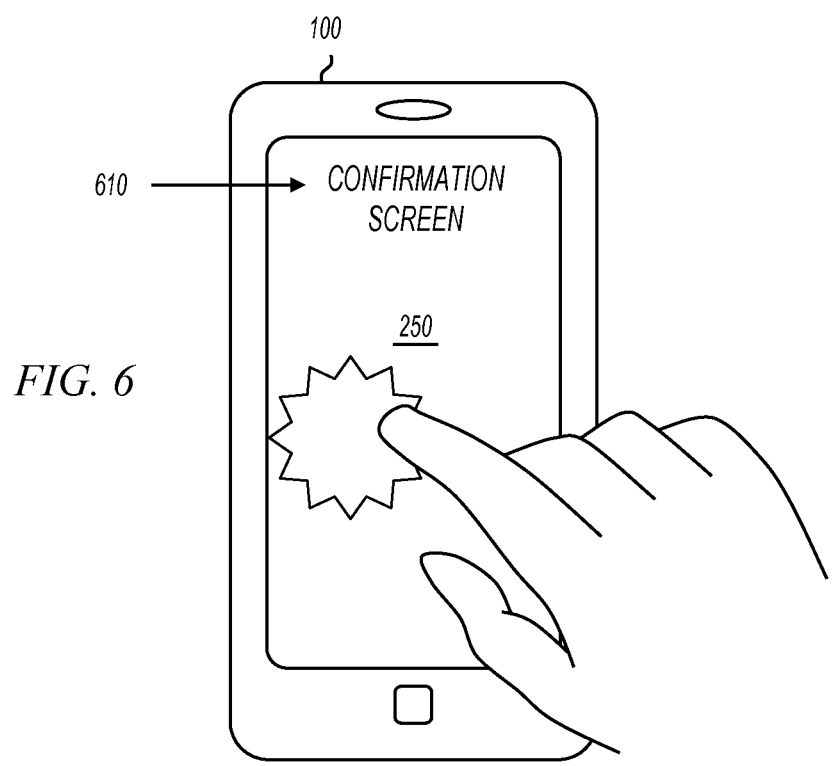

FIGS. 5 and 6 show user interaction with a mobile device during Learning Mode in accordance with various embodiments of the present invention. FIG. 5 shows a user providing indicia of the approximate location of radio token 300 in relation to mobile device 100 in Learning Mode application screen 510. A user provides this indication in response to mobile device 100 prompting the user to provide such indicia after having alerted the user of a detection of an established communications distance between a radio token compatible mechanism, within mobile device 100, and radio token 300 (FIG. 4). Although a human hand is shown providing an indication on touch sensitive display device 250, this is not a limitation of the present invention. In some embodiments a user may provide indication using a stylus pen or any other type of small tool compatible with touch sensitive mobile devices. Further, in some embodiments, a user may provide audible indication.

FIG. 6 shows a user confirming, in Learning Mode application screen 610, the indicia provided previously in Learning Mode application screen 510. A user provides this confirmation in response to mobile device 100 prompting the user to confirm the indication provided of the approximate location of radio token 300 in relation to the mobile device 100 (FIG. 5). Although a human hand is shown providing a confirmation on touch sensitive display device 250, this is not a limitation of the present invention. In some embodiments a user may provide indication using a stylus pen or any other type of small tool compatible with touch sensitive mobile devices. Further, in some embodiments, a user may provide audible confirmation.

FIG. 5 and FIG. 6 show a human hand providing indication and confirmation of the approximate location of radio token 300 in relation to mobile device 100 at the time the radio token compatible mechanism detected radio token 300; however this is not to be taken in a limiting sense. In some embodiments, a user may provide initial indication using tactile representation on touch sensitive display device 250 and use audible representation when confirming, or vice versa. In still in further embodiments, a user may provide confirmation of the approximate location indicate by shaking and/or gesturing mobile device 100, activating motion sensors within the mobile device.

Figure 7:
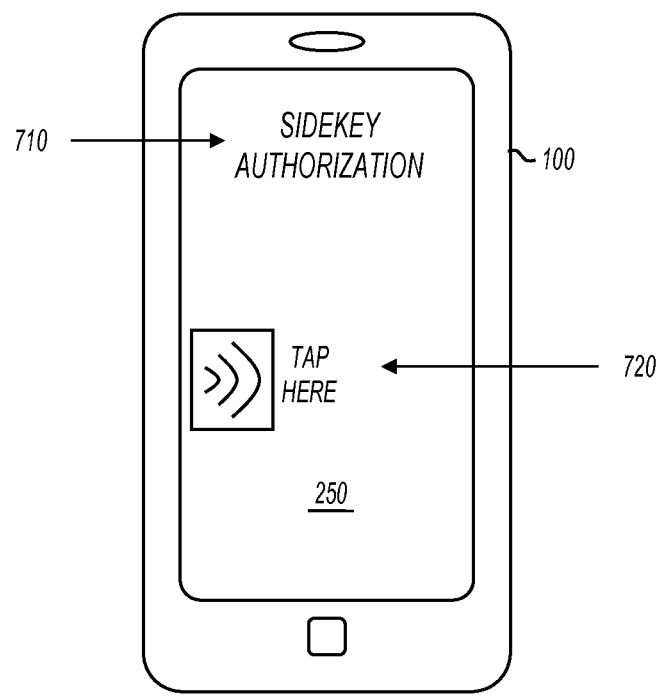
FIG. 7 shows mobile device interaction with a user during Learning Mode in accordance with various embodiments of the present invention.

FIG. 7 shows mobile device interaction with a user during Learning Mode in accordance with various embodiments of the present invention. Mobile device 100 includes touch sensitive display device 250 capable of providing visual representation 720 to the user of the confirmed approximate location indicated on mobile device 100 (FIG. 6). Visual representation 720 indicates the approximate location of radio token 300 in relation to mobile device 100 at the time a radio token compatible mechanism, within mobile device 100, detected radio token 300. Although mobile device 100 is shown displaying visual indicator 250 of the confirmed approximate location, this is not a limitation of the present invention. In some embodiments mobile device 100 provides indicia of the confirmed approximate location indicated on mobile device 100 using audible representation.

Furthermore, FIG. 7 is also a representation of the future interaction that mobile device 100 may provide a user, not necessarily in Learning Mode. The approximate location displayed in FIG. 7 may be stored and accessed subsequently by other applications within mobile device 100. For example, a mobile payment application at a point of sale transaction may also display the confirmed approximate location shown in FIG. 7, in order for a user to authorize the transaction. It should be noted that this is just presented as an example and that FIG. 7 shows future interaction that mobile device 100 may provide a user in various applications and/or purposes.

Figure 8:
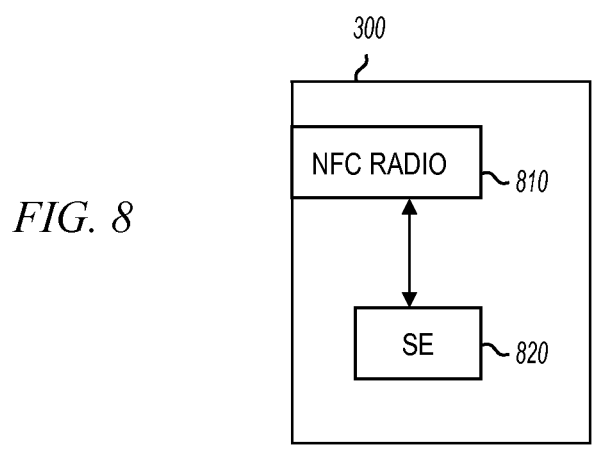
FIG. 8 shows a radio token in accordance with various embodiments of the present invention.

FIG. 8 shows a radio token in accordance with various embodiments of the present invention. Radio token 300 includes NFC radio 810, and secure element 820. Radio token 300 may be any type of radio token that includes the components shown. For example, in some embodiments, radio token 300 may be a key fob, a key chain, a smart card, any small hardware device with built-in authentication mechanisms, and the like.

NFC radio 810 is a radio that provides near field communications capability to radio token 300. In some embodiments, NFC radio 810 operates at 13.56 megahertz, although this is not a limitation of the present invention.

Secure element 820 provides secure information storage. In some embodiments, secure element 820 is a smartcard compatible secure element commonly found in credit card applications and/or security applications.

In some embodiments, NFC radio 810 and secure element 820 are separate devices as shown in FIG. 8, and in other embodiments, NFC radio 810 and secure element 820 are combined into a single integrated circuit. In still further embodiments, one or both of NFC radio 810 and secure element 820 are integrated into another semiconductor device such as a processor.

Examples of smart card controllers that combine both NFC radio 810 and secure element 820 are the "SmartMX" controllers sold by NXP Semiconductors N.V. of Eindhoven, The Netherlands. In some embodiments, the secure element has an ISO/IEC 7816 compatible interface that communicates with other components within radio token 300. Further, in some embodiments, the NFC radio has an ISO/IEC 14443 contactless interface.

Figure 9:
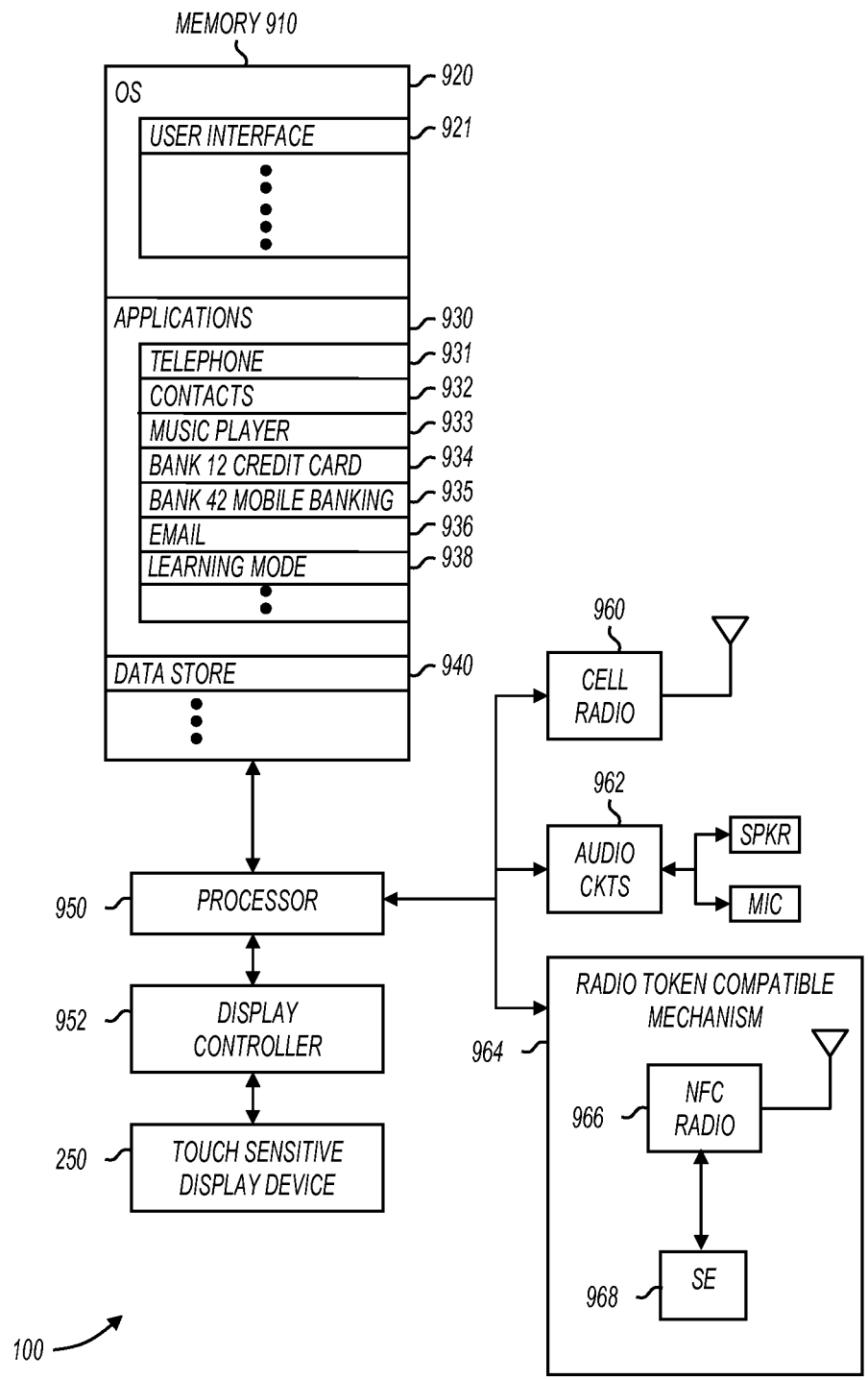
FIG. 9 shows a block diagram of a mobile device in accordance with various embodiments of the present invention.

FIG. 9 shows a mobile device in accordance with various embodiments of the present invention. Mobile device 100 includes processor 950, memory 910, display controller 952, touch sensitive display device 250, cellular radio 960, audio circuits 962, radio token compatible mechanism 964, near field communications (NFC) radio 966, and secure element 968. Mobile device 100 may be any type of mobile device that includes the components shown. For example, in some embodiments, mobile device 100 may be a cell phone, a smartphone, a tablet computer, a laptop computer, or the like.

Processor 950 may be any type of processor capable of executing instructions stored in memory 910 and capable of interfacing with the various components shown in FIG. 9. For example, processor 950 may be a microprocessor, a digital signal processor, an application specific processor, or the like. In some embodiments, processor 950 is a component within a larger integrated circuit such as a system on chip (SOC) or an application specific integrated circuit (ASIC).

Display controller 952 provides an interface between processor 950 and touch sensitive display device 250. In some embodiments, display controller 952 is integrated within processor 950, and in other embodiments, display controller 952 is integrated within touch sensitive display device 250.

Touch sensitive display device 250 is a display device that includes a touch sensitive surface, sensor, or set of sensors that accept input from a user. For example, touch sensitive display device 250 may detect when and where an object touches the screen, and may also detect movement of an object across the screen. When touch sensitive display device detects input, display controller 952 and processor 950 (in association with user interface component 921) determine whether an input is to be recognized.

Touch sensitive display device 250 may be manufactured using any applicable display technologies, including for example, liquid crystal display (LCD), active matrix organic light emitting diode (AMOLED), and the like. Further, touch sensitive display device 250 may be manufactured using any application touch sensitive input technologies, including for example, capacitive and resistive touch screen technologies, as well as other proximity sensor technologies.

Cellular radio 960 may be any type of radio that can communicate within a cellular network. Examples include, but are not limited to, radios that communicate using orthogonal frequency division multiplexing (OFDM), code division multiple access (CDMA), time division multiple access (TDMA), and the like. Cellular radio 960 may operate at any frequency or combination of frequencies without departing from the scope of the present invention. In some embodiments, cellular radio 960 is omitted.

Audio circuits 962 provide an interface between processor 950 and audio devices such as a speaker and a microphone.

Radio token compatible mechanism 964 is a mechanism that can detect when a radio token is within a communications distance. As shown in FIG. 9, radio token compatible mechanism may include NFC radio 966 and secure element 968; however this is not a limitation of the present invention. For example, in some embodiments, radio token compatible mechanism may only include NFC radio 966.

NFC radio 966 is a radio that provides near field communications capability to mobile device 100. In some embodiments, NFC radio 966 operates at 13.56 megahertz, although this is not a limitation of the present invention. Further in some embodiments, NFC radio 966 has an ISO/IEC 14443 contactless interface.

Secure element 968 provides secure information storage. In some embodiments, secure element 968 is a smartcard compatible secure element commonly found in credit card applications and/or security applications.

In some embodiments, NFC radio 966 and secure element 968 are separate devices within radio token compatible mechanism 964 as shown in FIG. 9, and in other embodiments, NFC radio 966 and secure element 968 are combined into a single integrated circuit. In still further embodiments, one or both of NFC radio 966 and secure element 968 are integrated into another semiconductor device such as processor 950.

Mobile device 100 may include many other circuits and services that are not specifically shown in FIG. 9. For example, in some embodiments, mobile device 100 may include a global positioning system (GPS) radio, a Bluetooth radio, haptic feedback devices, and the like. Any number and/or type of circuits and services may be included within mobile device 100 without departing from the scope of the present invention.

Memory 910 may include any type of memory device. For example, memory 910 may include volatile memory such as static random access memory (SRAM), or nonvolatile memory such as FLASH memory. Memory 910 is encoded with (or has stored therein) one or more software modules (or sets of instructions), that when accessed by processor 950, result in processor 950 performing various functions. In some embodiments, the software modules stored in memory 910 may include an operating system (OS) 920 and applications 930. Applications 930 may include any number or type of applications. Examples provided in FIG. 9 include a telephone application 931, a contacts application 932, a music player application 933, a mobile payment application (Bank 12 Credit Card) 934, a mobile banking application (Bank 42 Mobile Banking) 935, an email application 936, and a Learning Mode application 938. Memory 910 may also include any amount of space dedicated to data storage 940.

Operating system 920 may be a mobile device operating system such as an operating system to control a mobile phone, smartphone, tablet computer, laptop computer, or the like. As shown in FIG. 9, operating system 920 includes user interface component 921. Operating system 920 may include many other components without departing from the scope of the present invention.

Telephone application 931 may be an application that controls a cell phone radio. Contacts application 932 includes software that organizes contact information. Contacts application 932 may communicate with telephone application 931 to facilitate phone calls to contacts. Music player application 933 may be a software application that plays music files that are stored in data store 940.

Mobile payment application 934 may be a software application that provides access to one or more payment instruments such as credit cards, debit cards, and pre-paid cards. Mobile banking application 935 may be a software application that communicates with a banking service to allow banking functions such as balance inquiries, funds transfers, bill payment and the like. Mobile banking application 935 may be a downloaded "thick" application, or may be a "thin" application that uses Internet browser functionality.

Learning Mode application 938 is capable of determining the approximate location of an NFC radio in a radio token compatible mechanism within a mobile device. Learning Mode application 938 can be launched by a user or by another application within mobile device 100. Once launched, Learning Mode application 938 may interact with a user prompting the user to scan radio token 300 in proximity with mobile device. Learning Mode application 938 may also alert the user when the radio token is within communications distance of the radio token compatible mechanism within mobile device 100. As a result of prompting the user to interact with mobile device 100 and provide indicia of the approximate location of radio token 300 in relation to mobile device 100, Learning Mode application 938 is capable of determining the approximate location of NFC radio 966 within mobile device 100 and provides future indication to the user.

Each of the above-identified applications corresponds to a set of instructions for performing one or more functions described above. These applications (sets of instructions) need not be implemented as separate software programs, procedures or modules, and thus various subsets of these applications may be combined or otherwise re-arranged in various embodiments. For example, telephone application 931 may be combined with contacts application 932. Furthermore, memory 910 may store additional applications (e.g., video players, camera applications, etc.) and data structures not described above.

It should be noted that device 100 is presented as an example of a mobile device, and that device 100 may have more or fewer components than shown, may combine two or more components, or may have a different configuration or arrangement of components. For example, mobile device 100 may include many more components such as sensors (optical, touch, proximity etc.), or any other components suitable for use in a mobile device.

Memory 910 represents a computer-readable medium capable of storing instructions, that when accessed by processor 950, result in the processor performing as described herein. For example, when processor 950 accesses instructions within Learning mode application 938, processor 950 launches Learning Mode application 102 and prompts user to scan radio token 300 in proximity with mobile device 100.

Figure 10:
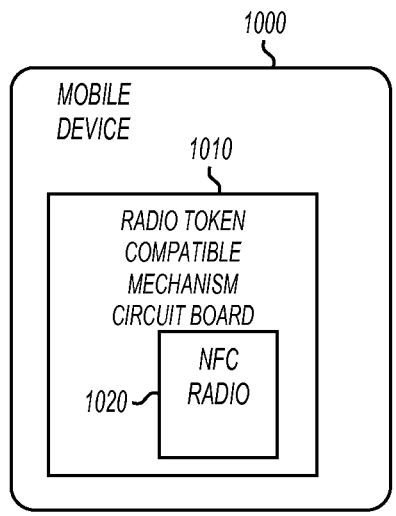
FIG. 10 shows a mobile device with a near field communications (NFC) radio on a circuit board in accordance with various embodiments of the present invention.

FIG. 10 shows a mobile device with a near field communications (NFC) radio on a circuit board in accordance with various embodiments of the present invention. Mobile device 1000 includes circuit board 1010, which in turn includes NFC radio 1020. Circuit board 1010 may include a processor, memory, or circuits that support other services. In some embodiments, circuit board 1010 is a board that is fixed within mobile device 1000 and that includes many components other than those shown. In some embodiments circuit board 1010 may also include a secure element, and in other embodiments NFC radio 1020 may be coupled to a secure element outside of circuit board 1010.

In some embodiments, NFC radio 1020 resides in an add-on slot on the circuit board, and may be removable or nonremovable. For example, in some embodiments, an add-on slot may be provided on circuit board 1010 to accept NFC radio 1020. In some of these embodiments, NFC radio 1020 may be user accessible and removable, and in other embodiments, NFC radio 1020 may be nonremovable even though it resides in an add-on slot.

Figure 11:
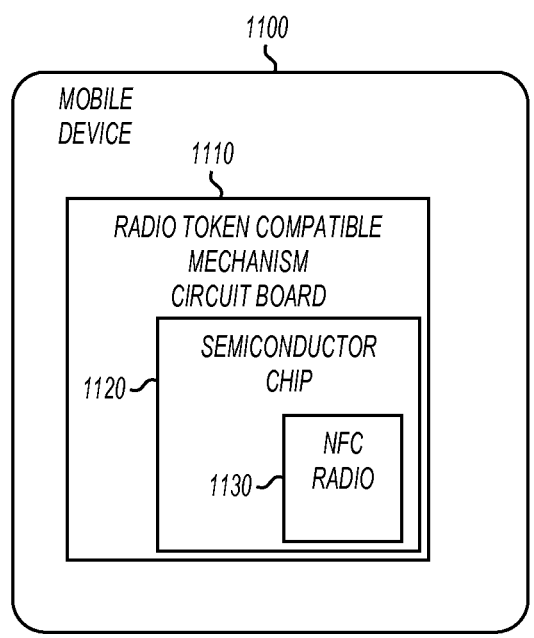
FIG. 11 shows a mobile device with an NFC radio in a semiconductor chip in accordance with various embodiments of the present invention.

FIG. 11 shows a mobile device with an NFC radio in a semiconductor chip in accordance with various embodiments of the present invention. Mobile device 1100 includes circuit board 1110, which in turn includes semiconductor chip 1120. Semiconductor chip 1120 also includes NFC radio 1130. In some embodiments, the semiconductor chip includes other functionality such as a microprocessor. In some embodiments, NFC radio 1130 is embedded within semiconductor chip 1120. Circuit board 1110 includes circuits that provide one or more services. For example, circuit board 1110 may include a memory, a display controller, a cellular radio, or the like. In some embodiments, circuit board 1110 is a board that is fixed within mobile device 1100 and that includes many components other than those shown. In some embodiments semiconductor chip 1120 may also include a secure element, and in other embodiments NFC radio 1130 may be coupled to a secure element outside of semiconductor chip 1120.

In some embodiments, NFC radio 1130 resides in an add-on slot in the semiconductor chip, and the semiconductor chip resides in an add-on slot on the circuit board, and both may be removable or nonremovable.

Figure 12:
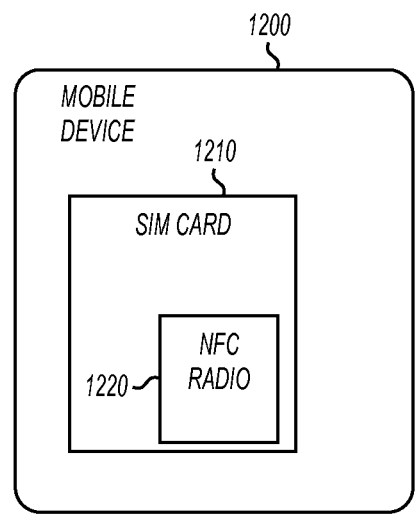
FIG. 12 shows a mobile device with an NFC radio on a subscriber identity module (SIM) card in accordance with various embodiments of the present invention.

FIG. 12 shows a mobile device with an NFC radio on a subscriber identity module (SIM) card in accordance with various embodiments of the present invention. Mobile device 1200 includes subscriber identity module (SIM) 1210, which in turn includes NFC radio 1220. SIM 1210 includes circuits that provide one or more services. For example, SIM 1210 may include other circuits that identify a user of mobile device 1200 to a mobile network operator. In some embodiments, SIM card 1210 is a removable card that is inserted into an add-on slot within mobile device 1200 and includes many components other than those shown. In some embodiments, SIM card 1210 may be added to a non-removable add-on slot. In some embodiments SIM card 1210 may also include a secure element, and in other embodiments NFC radio 1220 may be coupled to a secure element outside of SIM card 1210.

Figure 13:
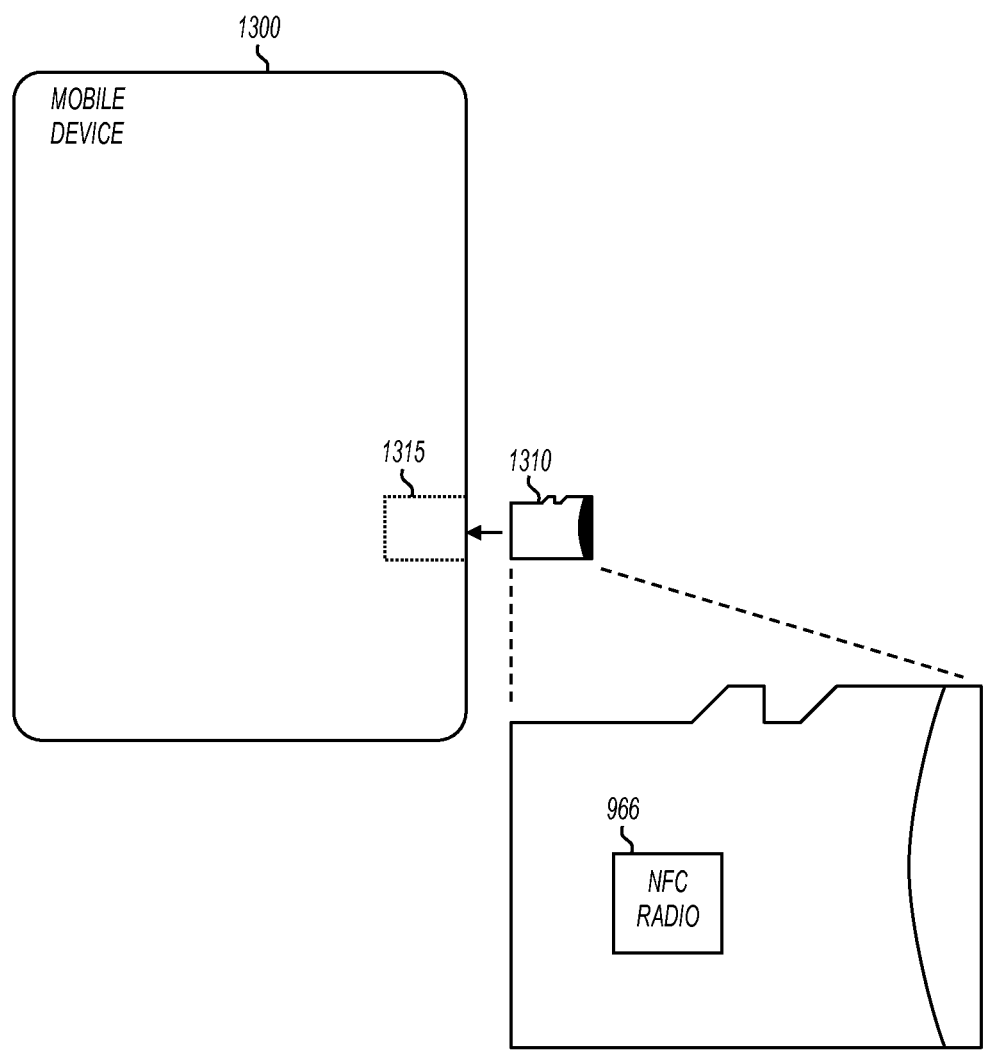
FIG. 13 shows a mobile device with a memory card that includes an NFC radio in accordance with various embodiments of the present invention.

FIG. 13 shows a mobile device with a memory card that includes an NFC radio in accordance with various embodiments of the present invention. Mobile device 1300 includes add-on slot 1315. Add-on slot 1315 accepts memory card 1310, which is shown as a microSD memory card; however this is not a limitation of the present invention. In some embodiments, microSD memory card 1310 may be added to a non-removable add-on slot. For example, system memory for mobile device 1300 may be provided by memory card 1310, and memory card 1310 may be placed in an add-on slot 1315 in such a manner that it is nonremovable. Memory card 1310 includes NFC radio 966. The combination of mobile device 1300 and memory card 1310 is an example of an electronic system that includes a mobile device and an add-on card that includes an NFC radio.

Figure 14:
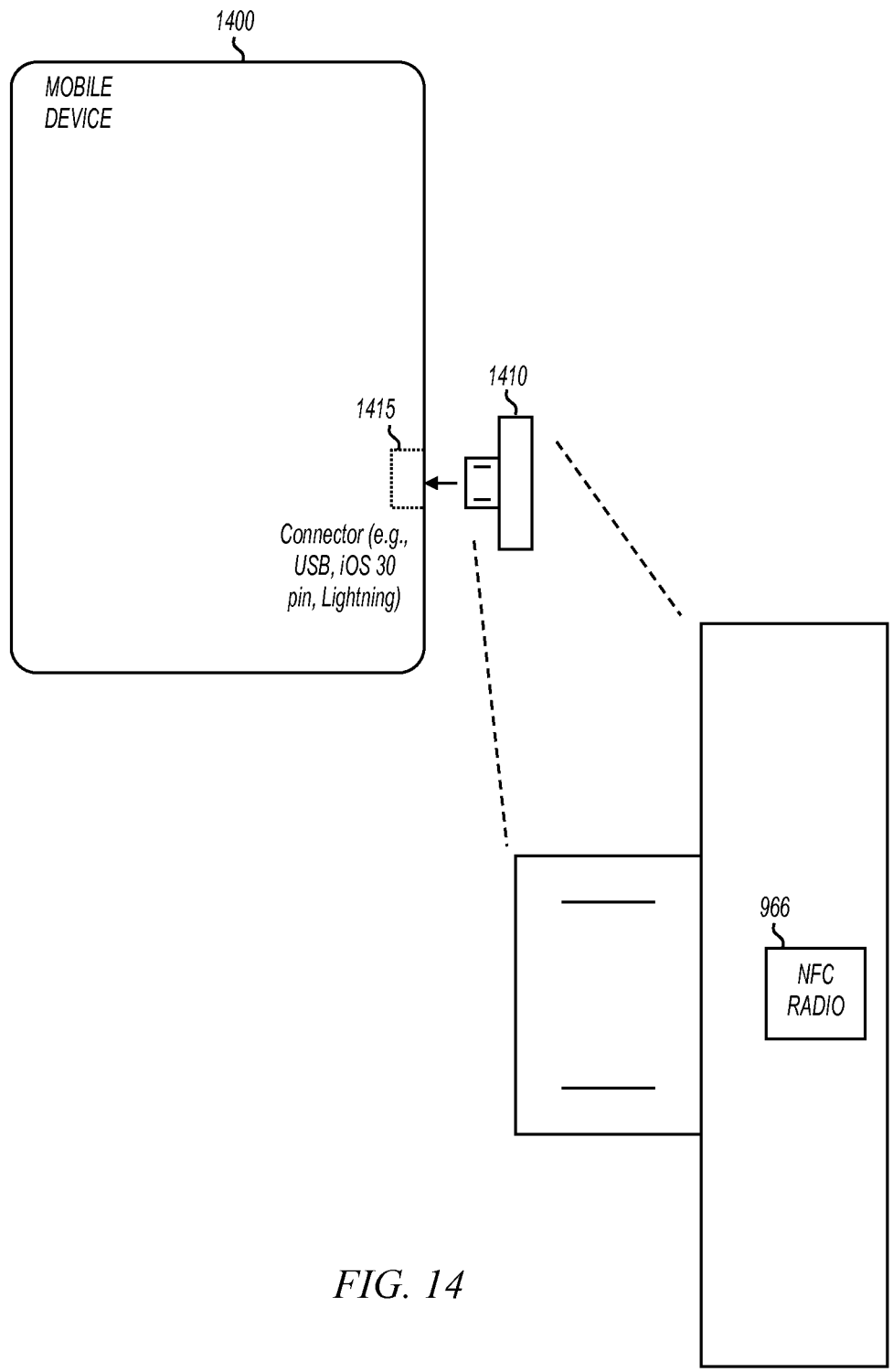
FIG. 14 shows a mobile device compatible with a device having an NFC radio in accordance with various embodiments of the present invention.

FIG. 14 shows a mobile device compatible with a device having an NFC radio in accordance with various embodiments of the present invention. Mobile device 1400 includes add-on slot 1415. Add-on slot 1415 is shown as a connector port that accepts connector device 1410; however this is not a limitation of the present invention. Add-on slot 1415 may any type of connector port capable of performing as described. For example, add-on slot 1415 may be a universal serial bus (USB) connector port, an iOS 30 pin connector port, a Lightning connector port, or the like. Connector device 1410 may be any type of connector device capable of performing as described. For example, connector device 1410 may be a universal serial bus (USB) connector, an iOS 30-pin connector, a Lightning connector, or the like. Connector device 1410 includes NFC radio 966. The combination of mobile device 1400 and device 1410 is an example of an electronic system that includes a mobile device and a connector device that includes an NFC radio. In some embodiments, connector device 1410 may be added to a non-removable add-on slot 1415.

In some embodiments the device with the NFC radio may not be physically present in an add-on slot. It may be coupled via any combination of electric, magnetic, and optical means such as Bluetooth, NFC, infrared.

Figure 15:
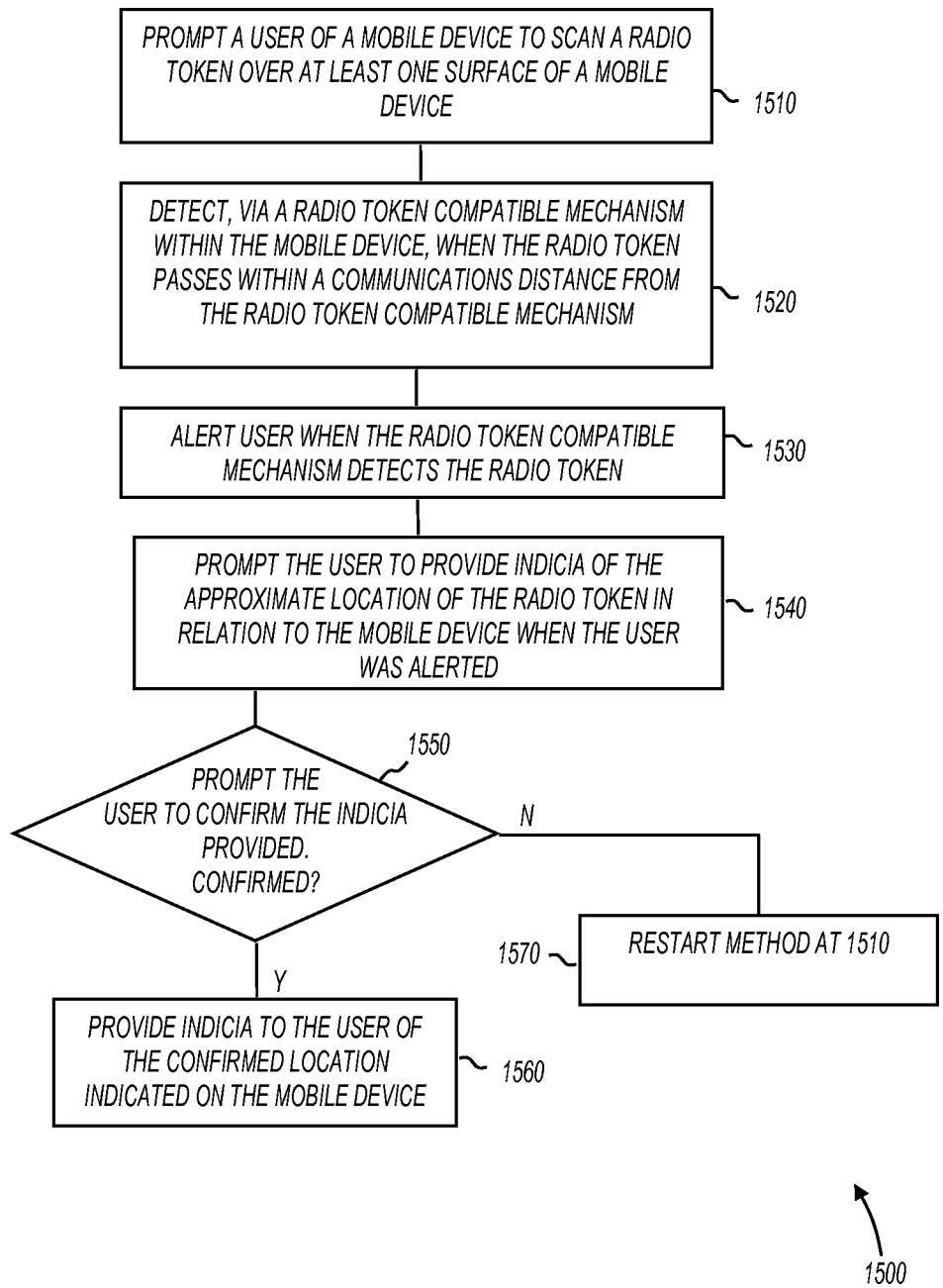
FIG. 15 shows a flowchart of methods in accordance with various embodiments of the present invention.

FIG. 15 shows a flowchart of methods in accordance with various embodiments of the present invention. In some embodiments, methods 1500 may be performed by a mobile device such as any of mobile devices 100, 1000, 1100, 1200, 1300, or 1400. Further, in some embodiments, methods 1500 may be performed by a processor that is executing instructions, such as user interface component 921 and/or learning mode component 938. Methods 1500 are not limited by the type of system or entity that performs the methods. The various actions of methods 1500 may be performed in the order presented, in a different order, or simultaneously. Further, in some embodiments, some actions listed in FIG. 15 are omitted from methods 1500.

Methods 1500 begin at 1510 in which a user of a mobile device is prompted to scan a radio token over at least one surface of a mobile device. Scanning may include waving, gesturing, surveying, and the like. A surface may include an edge, a surface or any combination thereof.

At 1520, there is detection, via a radio token compatible mechanism within the mobile device, of when the radio token passes within a communications distance from the radio token compatible mechanism. A communications distance may be the distance at which any type of communication via radio frequencies is achieved between two electrical components.

At 1530, the user is alerted when the radio token compatible mechanism detects the radio token. Alerting the user may include providing visual, audible or haptic representation. In some embodiments, this includes a combination thereof. Further, the use of one type of representation is not mutually exclusive.

At 1540, the user is prompted to provide indicia of the approximate location of the radio token in relation to the mobile device when the user was alerted. In some embodiments, user may provide indication on the touch sensitive display device. Further, in some embodiments, the indicia that the user provides may be visual, audible, haptic representation.

At 1550, the user is prompted to confirm the indicia provided at 1540. In some embodiments this stepped is omitted. Further, in some embodiments the confirmation that the user provides is not limited to the same type of representation provided at 1540. For example a user may initially provide tactile indicia and then subsequently provide audible confirmation, or vice versa.

If the confirmation provided by the user is correct, then there is indicia provided to the user of the confirmed approximate location indicated on the mobile device, see 1560. If the confirmed approximate location is not correct then the process restarts at method 1510, see 1570.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
prompting a user of a mobile device to scan a radio token over at least one surface of a mobile device;
detecting, via a radio token compatible mechanism within the mobile device, when the radio token passes within a communications distance from the radio token compatible mechanism;
alerting the user when the radio token compatible mechanism detects the radio token; and
prompting the user to provide indicia of the approximate location of the radio token in relation to the mobile device when the user was alerted of the radio token compatible mechanism detecting the radio token.

2. The method of claim 1 further comprising prompting the user to confirm the indicia of the approximate location of the radio token in relation to the mobile device provided.

3. The method of claim 2 further comprising providing indicia to the user of the confirmed location indicated on the mobile device.

4. The method of claim 1 wherein the mobile device comprises a mobile phone.

5. The method of claim 1 wherein the radio token compatible mechanism comprises a secure element.

6. The method of claim 1 wherein the radio token compatible mechanism comprises a near field communications radio.

7. The method of claim 6 wherein the near field communications radio is a near field communications radio in a microSD memory card.

8. The method of claim 6 wherein the near field communications radio is a near field communications radio in a subscriber identity module (SIM) card.

9. The method of claim 6 wherein the near field communications radio is a near field communications radio on a circuit board within the radio token compatible mechanism.

10. The method of claim 3 wherein the near field communications radio is a near field communications radio inside a semiconductor chip within the radio token compatible mechanism.

11. The method of claim 10 wherein the semiconductor chip comprises a microprocessor.

12. The method of claim 1 wherein detecting when the radio token passes within a communications distance comprises detecting when a radio token having a secure element passes within a communications distance from the radio token compatible mechanism.

13. A non-transitory computer readable medium having instructions stored thereon that when executed cause a computer to perform:
   requesting a user to scan a radio token in proximity with a mobile device;
   establishing a communication between the radio token and a radio token compatible mechanism within the mobile device;
   notifying the user when there is an established connection between the radio token and the radio token compatible mechanism within the mobile device; and
   prompting the user to indicate the approximate location of the radio token in relation to the mobile device at the time the user was notified of the established connection between the radio token and the radio token compatible mechanism within the mobile device.

14. The non-transitory computer readable medium of claim 13 having instructions stored thereon that when executed cause a computer to further perform requesting the user to confirm the indication given of the approximate location of the radio token in relation to the mobile device.

15. The non-transitory computer readable medium of claim 14 having instructions stored thereon that when executed cause a computer to further perform providing indicia to the user of the confirmed indicated location of the radio token in relation to the mobile device.

16. A mobile device comprising:
   a radio token compatible mechanism;
   a processor; and
   a memory having instructions stored therein and configured to be executed by the processor, the memory including instructions for:
      prompting the user to scan a radio token over at least one surface of the mobile device;
      detecting when the radio token passes within a communications distance from the radio token compatible mechanism;
      alerting the user when the radio token passes within the communications distance from the radio token compatible mechanism; and
      prompting the user to provide indicia of the approximate location of the radio token in relation to the mobile device at the time the user is alerted.

17. The mobile device of claim 16 wherein the instructions stored in the memory and configured to be executed by the processor further include instructions for prompting the user to confirm the indicia provided of the approximate location of the radio token in relation to the mobile device.

18. The mobile device of claim 17 wherein the instructions stored in the memory and configured to be executed by the processor further include instructions for providing to the user indicia of the confirmed location indicated.

19. The mobile device of claim 16 wherein the mobile device comprises a mobile phone.

20. The mobile device of claim 16 wherein the radio token compatible mechanism comprises a near field communications radio.

21. The mobile device of claim 20 wherein the near field communications radio is a near field communications radio in a microSD memory card.

22. The mobile device of claim 20 wherein the near field communications radio is a near field communications radio on a circuit board within the radio token compatible mechanism.

23. The mobile device of claim 20 wherein the near field communications radio is a near field communications radio inside a semiconductor chip within the radio token compatible mechanism.

24. The mobile device of claim 23 wherein the semiconductor chip comprises a microprocessor.

25. The mobile device of claim 16 wherein the radio token compatible mechanism comprises a secure element.

26. The mobile device of claim 16 wherein the radio token compatible mechanism is configured to communicate with a secure element in a radio token.

* * * * *

UNITED STATES PATENT AND TRADEMARK OFFICE
CERTIFICATE OF CORRECTION

| | | |
|---|---|---|
| PATENT NO. | : 9,113,329 B2 | |
| APPLICATION NO. | : 14/083208 | |
| DATED | : August 18, 2015 | |
| INVENTOR(S) | : Siva G. Narendra et al. | |

It is certified that error appears in the above-identified patent and that said Letters Patent is hereby corrected as shown below:

In the claims,

Column 11, line 7, Claim 10, the claim reference numeral '3', should read -6-.

10. The method of claim [[3]] 6 wherein the near field communications radio is a near field communications radio inside a semiconductor chip within the radio token compatible mechanism.

Signed and Sealed this
Twenty-ninth Day of December, 2015

Michelle K. Lee
*Director of the United States Patent and Trademark Office*